United States Patent
Okamoto et al.

(10) Patent No.: US 12,522,781 B2
(45) Date of Patent: *Jan. 13, 2026

(54) ALPHA-HYDROXYISOBUTYRIC ACID ESTER COMPOUND AND FRAGRANCE COMPOSITION

(71) Applicant: MITSUBISHI GAS CHEMICAL COMPANY, INC., Chiyoda-ku (JP)

(72) Inventors: Atsushi Okamoto, Niigata (JP); Kyoko Hiraoka, Niigata (JP); Umi Yokobori, Niigata (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 709 days.

This patent is subject to a terminal disclaimer.

(21) Appl. No.: 17/787,525

(22) PCT Filed: Dec. 22, 2020

(86) PCT No.: PCT/JP2020/047856
§ 371 (c)(1),
(2) Date: Jun. 20, 2022

(87) PCT Pub. No.: WO2021/132214
PCT Pub. Date: Jul. 1, 2021

(65) Prior Publication Data
US 2022/0403289 A1 Dec. 22, 2022

(30) Foreign Application Priority Data
Dec. 24, 2019 (JP) .................. 2019-233339

(51) Int. Cl.
*C07C 69/675* (2006.01)
*C11B 9/00* (2006.01)

(52) U.S. Cl.
CPC .......... *C11B 9/0019* (2013.01); *C07C 69/675* (2013.01)

(58) Field of Classification Search
CPC .............................. C11B 9/0019; C07C 69/675
See application file for complete search history.

(56) References Cited

U.S. PATENT DOCUMENTS

| | | | |
|---|---|---|---|
| 2,836,611 A | 5/1958 | Exner et al. | |
| 3,368,943 A | 2/1968 | Gilbert | |
| 5,260,051 A | 11/1993 | Cho | |
| 8,669,338 B2* | 3/2014 | Carloff | C08F 8/14 526/325 |
| 2005/0119443 A1 | 6/2005 | Barsotti et al. | |
| 2006/0110415 A1 | 5/2006 | Gupta | |
| 2012/0172563 A1 | 7/2012 | Carloff et al. | |
| 2020/0165539 A1 | 5/2020 | Lelievre et al. | |
| 2021/0269740 A1 | 9/2021 | Okamoto et al. | |

FOREIGN PATENT DOCUMENTS

| | | |
|---|---|---|
| CN | 102574942 A | 7/2012 |
| CZ | 240718 B1 | 8/1987 |
| JP | 11-512132 A | 10/1999 |
| JP | 2011-512132 A | 4/2011 |
| WO | WO 2009/124888 A1 | 10/2009 |
| WO | WO 2018/210725 A1 | 11/2018 |
| WO | WO 2020/004468 A1 | 1/2020 |
| WO | WO 2021/250164 A1 | 12/2021 |

OTHER PUBLICATIONS

International Search report issued Mar. 30, 2021 in PCT/JP2020/047856, filed on Dec. 22, 2020, 2 pages.
"Gousei Koryo: Kagaku to Shohin Chisiki, zoho sinban (Synthetic fragrance: chemistry and product knowledge, new enlarged edition)", The Chemical Daily Co. Ltd., 2016, p. 580 to 582.
Maki et al. "N-Alkyl-4-boronopyridinium Halides versus Boric Acid as Catalysts for the Esterification of α-Hydroxycarboxylic Acids", Organic Letters, vol. 7, No. 22, 2005 pp. 5047-5050.
Kirillov et al. "α-Alkoxycarbonylisopropyl Chloroformates and the Peroxydicarbonates based on them", Zhurnal Organicheskoi Khimii, vol. 7, No. 9, 1971, pp. 1944-1946.

* cited by examiner

*Primary Examiner* — Sikarl A Witherspoon
(74) *Attorney, Agent, or Firm* — Oblon, McClelland, Maier & Neustadt, L.L.P.

(57) ABSTRACT

A fragrance composition containing a compound represented by Formula (1) as an active ingredient:

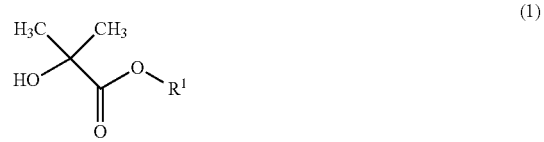

(1)

where in Formula (1), $R^1$ represents a chain hydrocarbon group having from 7 to 20 carbons, and may be linear or branched, and a saturated group or an unsaturated group, and when $R^1$ is an unsaturated group, $R^1$ may have one or more carbon-carbon double bond(s) or carbon-carbon triple bond(s).

12 Claims, No Drawings

ALPHA-HYDROXYISOBUTYRIC ACID ESTER COMPOUND AND FRAGRANCE COMPOSITION

CROSS-REFERENCE TO RELATED APPLICATIONS

The present application is a 35 U.S.C. § 371 national stage application of International patent application PCT/JP2020/047856, filed Dec. 22, 2020, which is based on and claims the benefit of priority to Japanese Application No. 2019-233339, filed Dec. 24, 2019. The entire contents of these applications are incorporated herein by reference.

TECHNICAL FIELD

The present invention relates to an α-hydroxyisobutyric acid ester compound and a fragrance composition.

BACKGROUND ART

Some isobutyric acid esters are known to be compounds useful as fragrances. For example, Non-Patent Literature 1 describes that various isobutyric acid esters are mainly used as flavors, and all the isobutyric acid esters are flavor materials having a fruit scent; specifically, methyl isobutyrate gives a sweet apricot-like scent, propyl isobutyrate gives a strong pineapple-like scent, butyl isobutyrate gives a fresh apple- and banana-like scent, and isoamyl isobutyrate gives a sweet apricot- and pineapple-like scent.

Additionally, Patent Document 1 discloses that, as an isobutyric acid ester having a bond with oxygen at α-position, a straight-chain or branched alkyl ester of α-alkoxyisobutyric acid, the alkyl ester having 4 to 12 carbon atoms, is useful as a fragrance, and n-hexyl α-ethoxyisobutyrate has a lavender-like aroma.

There are many known substances in α-hydroxyisobutyric acid esters of chain higher alcohols having 7 or more carbons. For example, Patent Document 2 discloses that an alkyl ester having from 8 to 20 carbons of α-hydroxyisobutyric acid is useful as a lubricating oil or a resin additive and can be synthesized from acetone cyanhydrin and a corresponding alcohol in the presence of hydrochloric acid. Specifically, Patent Document 2 discloses 2-ethylhexyl ester of α-hydroxyisobutyric acid; a mixture of decyl ester and dodecyl ester of α-hydroxyisobutyric acid; and a mixture of hexadecyl ester, octadecyl ester, and an eicosa ester of α-hydroxyisobutyric acid.

In addition, Non-Patent Literature 2 discloses that octyl α-hydroxyisobutyrate can be selectively synthesized by reacting α-hydroxyisobutyric acid and octyl alcohol in the presence of a special catalytic species. Non-Patent Literature 3 discloses that nonanyl α-hydroxyisobutyrate can be synthesized from α-hydroxyisobutyric acid and nonanyl alcohol in the presence of an acid catalyst species. Patent Document 3 discloses that decyl α-hydroxyisobutyrate is useful as a raw material for a surface active agent.

CITATION LIST

Patent Documents

Patent Document 1: U.S. Pat. No. 3,368,943
Patent Document 2: Czechoslovak Patent 240,718
Patent Document 3: U.S. Pat. No. 5,260,051

Non-Patent Literatures

Non-Patent Literature 1: "Gousei Koryo: Kagaku to Shohin Chisiki, zoho sinban (Synthetic fragrance: chemistry and product knowledge, new enlarged edition)", The Chemical Daily Co. Ltd., 2016, p. 580 to 582

Non-Patent Literature 2: Organic Letters (2005), 7(22), 5047-5050.

Non-Patent Literature 3: Zhurnal Organicheskoi Khimii (1971), 7(9), 1875-8.

SUMMARY OF INVENTION

Technical Problem

An object to be solved by the present invention is to provide an α-hydroxyisobutyric acid ester compound useful as a fragrance and fragrance ingredient. Yet another object to be solved by the present invention is to provide a fragrance composition containing an α-hydroxyisobutyric acid ester compound as an active ingredient, and use of the compound as a fragrance.

Solution to Problem

The present inventors have synthesized various compounds and diligently studied the aromas of these compounds and found that a specific ester compound of α-hydroxyisobutyric acid is useful as a fragrance and fragrance ingredient.

That is, the present invention is as follows.

<1> A fragrance composition containing a compound represented by Formula (1) as an active ingredient:

[Chem. 1]

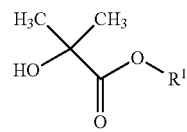

(1)

where in Formula (1), $R^1$ represents a chain hydrocarbon group having from 7 to 20 carbons, and may be linear or branched, and a saturated group or an unsaturated group, and when $R^1$ is an unsaturated group, $R^1$ may have one or more carbon-carbon double bond(s) or carbon-carbon triple bond(s).

<2> The fragrance composition according to <1>, wherein in Formula (1), $R^1$ is a linear hydrocarbon group.

<3> The fragrance composition according to <1>, wherein in Formula (1), $R^1$ is a branched hydrocarbon group.

<4> The fragrance composition according to <3>, wherein in Formula (1), $R^1$ has at least one or more quaternary carbon atom(s).

<5> The fragrance composition according to <1>, wherein in Formula (1), $R^1$ is a hydrocarbon group having a carbon-carbon unsaturated bond.

<6> The fragrance composition according to <5>, wherein in Formula (1), $R^1$ is a hydrocarbon group having one or more carbon-carbon double bond(s).

<7> The fragrance composition according to <5> or <6>, wherein in Formula (1), $R^1$ is a branched hydrocarbon group.

<8> A compound represented by Formula (2):

[Chem. 2]

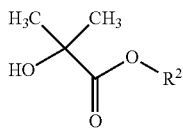

(2)

where in Formula (2), R² is a saturated branched chain hydrocarbon group having from 7 to 20 carbons, with the proviso that a 2-ethylhexyl group is excluded.
<9> The compound according to <8>, wherein in Formula (2), R² has at least one or more quaternary carbon atom(s).
<10> A compound represented by Formula (3):

[Chem. 3]

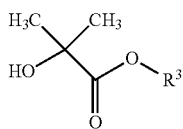

(3)

where in Formula (3), R³ represents an unsaturated chain hydrocarbon group having from 7 to 20 carbons,
<11> The compound according to <10>, wherein in Formula (3), R³ is a hydrocarbon group having at least one or more carbon-carbon double bond(s).
<12> The compound according to <10> or <11>, wherein in Formula (3), R³ is a branched hydrocarbon group.

Advantageous Effects of Invention

The present invention can provide the α-hydroxyisobutyric acid ester compound useful as a fragrance and a fragrance ingredient. Further, the present invention can provide the fragrance composition containing the α-hydroxyisobutyric acid ester compound as an active ingredient.

DESCRIPTION OF EMBODIMENTS

[Fragrance Composition and Use]
A fragrance composition of the present invention contains a compound represented by Formula (1) below as an active ingredient: Although α-hydroxyisobutyric acid ester compounds have been known, there has been no description of the scent peculiar to α-hydroxyisobutyric acid esters.
Hereinafter, the present invention will be described in detail.
<Compound Represented by Formula (1)>
A compound used in the fragrance composition of the present invention is represented by Formula (1) below:

[Chem. 4]

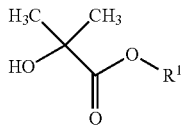

(1)

where in Formula (1), R¹ represents a chain hydrocarbon group having from 7 to 20 carbons, and may be linear or branched, and a saturated group or an unsaturated group, and when R¹ is an unsaturated group, R¹ may have one or more carbon-carbon double bond(s) or carbon-carbon triple bond(s).

In Formula (1), R¹ is a chain hydrocarbon group having from 7 to 20 carbons and is preferably a chain hydrocarbon group having from 7 to 15 carbons.

When R¹ is a saturated chain hydrocarbon group, R¹ is preferably a saturated branched chain hydrocarbon group having from 7 to 20 carbons and more preferably a saturated branched chain hydrocarbon group having from 7 to 10 carbons.

When R¹ is an unsaturated chain hydrocarbon group, R¹ is preferably an unsaturated chain hydrocarbon group having from 7 to 20 carbons and more preferably an unsaturated chain hydrocarbon group having from 8 to 15 carbons.

Examples of R¹ in Formula (1) specifically include a n-heptyl group, a heptan-2-yl group, a heptan-3-yl group, 2-methylhexyl group, a 2-ethylpentyl group, a 2,4-dimethylpentyl group, a 2,2-dimethylpentyl group, a 2,4-dimethylpentan-3-yl group, a 5-methylhexan-2-yl group, a n-octyl group, an octan-2-yl group, an octan-3-yl group, a 2-ethylhexyl group, a 2-ethyl-4-methylpentyl group, a 2,2-dimethylhexyl group, a 2,2,4-trimethylpentyl group, a 4,4-dimethylhexan-2-yl group, a 3,4-dimethylhexan-2-yl group, a 6-methylheptan-2-yl group, a 5-methylheptan-4-yl group, a 5-methylheptan-3-yl group, a n-nonyl group, a nonan-2-yl group, a nonan-3-yl group, a 7-methyloctyl group, a 6-methyloctan-2-yl group, a 2,6-dimethylheptyl group, a 2,6-dimethylheptan-4-yl group, a 3,5,5-trimethylhexyl group, a n-decyl group, an 8-methylnonyl group, a 3-propylheptyl group, a 3,7-dimethyloctyl group, a 2-ethyl-5-methylheptyl group, a 4,7-dimethyloctan-3-yl group, a 2,3,5-trimethylheptyl group, a 2,5,6-trimethylheptyl group, a 3,5,5-trimethylheptyl group, a n-undecyl group, an undecan-2-yl group, a n-dodecyl group, a 4,8-dimethyldecyl group, a 5,9-dimethyldecyl group, a 3,4,5,6,6-pentamethylheptan-2-yl group, an 11-methyldodecyl group, a 6,10-dimethylundecan-2-yl group, a 3,7,9-trimethyldecyl group, a n-tetradecyl group, a 2,6,10-trimethylundecanyl group, a 3,7,11-trimethyldodecadecyl group, a n-hexadecyl group, a n-octadecyl group, a 6,10,14-trimethylpentadecan-2-yl group, a n-eicosyl group, a 3,7,11,15-tetramethylhexadecyl group, a 1-octen-3-yl group, a 1-nonen-3-yl group, a 6-methyl-5-hepten-2-yl group, a 5-methyl-2-hepten-4-yl group, a 4,4-dimethyl-5-hexen-2-yl group, a 6-nonenyl group, a 2,6-nonadienyl group, a 3,6-nonadienyl group, a 2,6-dimethyl-5-heptenyl group, a 9-decenyl group, a 3,7-dimethyl-6-octenyl group, a 3,7-dimethyl-2,6-octadienyl group, a 2-isopropenyl-5-methyl-4-hexenyl group, a 2-isopropyl-5-methyl-2-hexenyl group, a 4,7-dimethyl-6-octen-3-yl group, a 2,5,6-trimethyl-4-heptenyl group, a 3,5,5-trimethyl-2,6-heptadienyl group, a 9-undecenyl group, a 10-undecenyl group, a 4-methyl-3-decen-5-yl group, a 4,8-dimethyl-4,9-decadienyl group, a 5,9-dimethyl-4,8-decadienyl group, a 3,5,6,6-tetramethyl-4-methyleneheptan-2-yl group, a 6,10-dimethyl-5,9-undecadien-2-yl group, a 3,7,9-trimethyl-2,6-decadienyl group, a 2,6,10-trimethyl-9-undecenyl group, a 2,6,10-trimethyl-5,9-undecadienyl group, an (E)-3,7,11-trimethyl-6,10-dodecadienyl group, a (Z)-3,7,11-trimethyl-6,10-dodecadienyl group, a (2E,6E)-3,7,11-trimethyl-2,6,10-dodecatrienyl group, a (2E,6Z)-3,7,11-trimethyl-2,6,10-dodecatrienyl group, a (2Z,6Z)-3,7,11-trimethyl-2,6,10-dodecatrienyl group, a (2Z,6E)-3,7,11-trimethyl-2,6,10-dodecatrienyl group, a 6,10,14- trimethyl-5,9,13-pentadecatrien-2-yl group, an (E)-3,7,11,15-tetramethyl-2-hexadecenyl group, and a (Z)-3,7,11,15-tetramethyl-2-hexadecenyl.

When the $R^1$ group has one or more carbon-carbon double bond(s), the compound represented by Formula (1) contains any one of the resulting stereoisomers or a mixture of the stereoisomers in any proportion. When the $R^1$ group has one or more asymmetric carbon(s), the compound represented by Formula (1) contains any one of the resulting optical isomers or a mixture of the optical isomers in any proportion.

The compound represented by Formula (1) is useful as a fragrance and fragrance ingredient, has a floral aroma, and in addition, simultaneously exhibits an aroma of a woody note, fruity note, spicy note, green note, or the like, depending on the different alkyl group (R) of the ester moiety.

The $R^1$ group is preferably a saturated linear hydrocarbon group.

The $R^1$ group is preferably a saturated branched hydrocarbon group.

The $R^1$ group is preferably a saturated branched hydrocarbon group having at least one or more quaternary carbon atom(s).

The $R^1$ group is preferably a hydrocarbon group having a carbon-carbon unsaturated bond.

The $R^1$ group is preferably a branched hydrocarbon group having a carbon-carbon unsaturated bond.

The $R^1$ group is preferably a hydrocarbon group having one or more carbon-carbon double bond(s).

The $R^1$ group is preferably a branched hydrocarbon group having one or more carbon-carbon double bond(s).

The $R^1$ group is particularly preferably a 5-methylhexan-2-yl group.

The $R^1$ group is particularly preferably a n-octyl group.

The $R^1$ group is particularly preferably an octan-3-yl group.

The $R^1$ group is particularly preferably a 6-methylheptan-2-yl group.

The $R^1$ group is particularly preferably a 2-ethylhexyl group.

The $R^1$ group is particularly preferably a 3,5,5-trimethylhexyl group.

The $R^1$ group is particularly preferably a 3,7-dimethyloctyl group.

The $R^1$ group is particularly preferably a 1-octen-3-yl group.

The $R^1$ group is particularly preferably a 3,7-dimethyl-6-octenyl group.

The $R^1$ group is particularly preferably a (2E,6E)-3,7,11-trimethyl-2,6,10-dodecatrienyl group.

The $R^1$ group is particularly preferably a (2E,6Z)-3,7,11-trimethyl-2,6,10-dodecatrienyl group.

The $R^1$ group is particularly preferably a (2Z,6Z)-3,7,11-trimethyl-2,6,10-dodecatrienyl group.

The $R^1$ group is particularly preferably a (2Z,6E)-3,7,11-trimethyl-2,6,10-dodecatrienyl group.

In the present invention, the compound represented by Formula (1) is exemplified by a compound represented by any of Formulas (1-1) to (1-86) below. The compound represented by Formula (1) is preferably a compound represented by any of Formulas (1-9), (1-13), (1-14), (1-18), (1-33), (1-56), (1-57), and (1-84) below.

[Chem. 5]

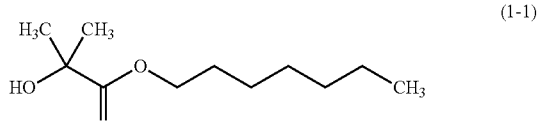
(1-1)

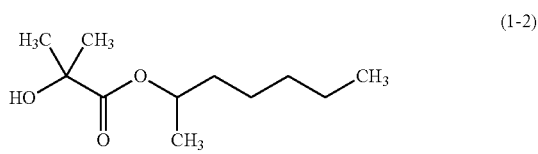
(1-2)

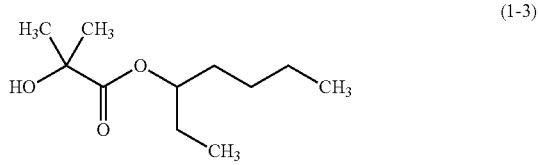
(1-3)

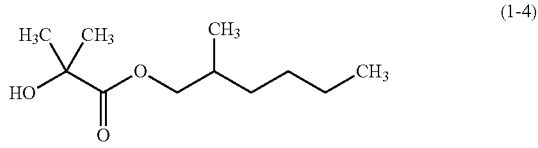
(1-4)

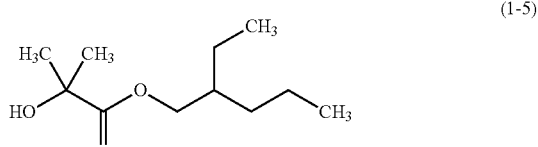
(1-5)

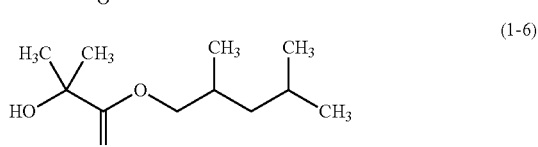
(1-6)

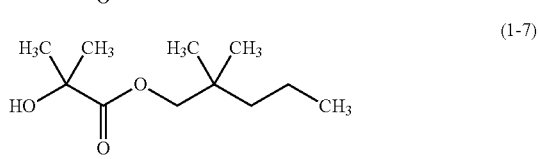
(1-7)

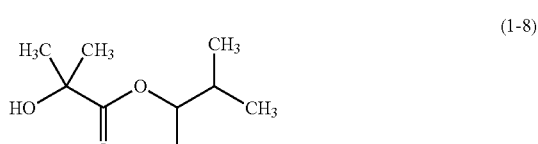
(1-8)

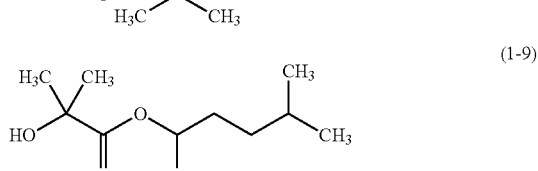
(1-9)

[Chem. 6]

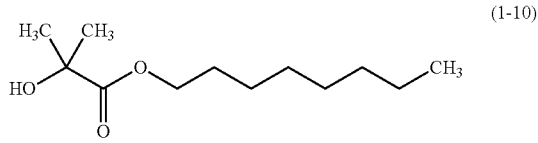
(1-10)

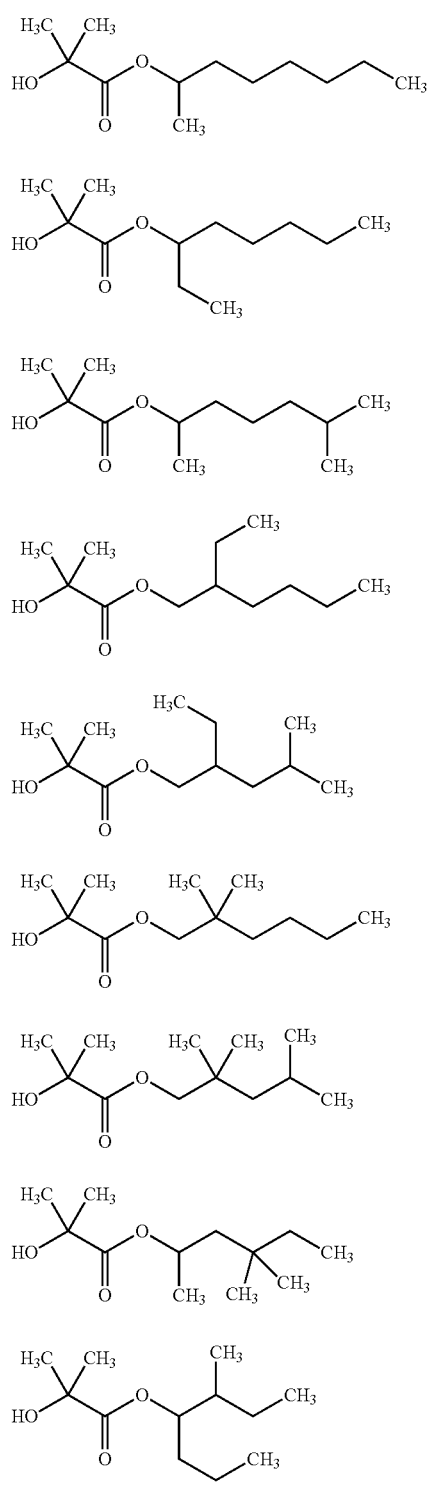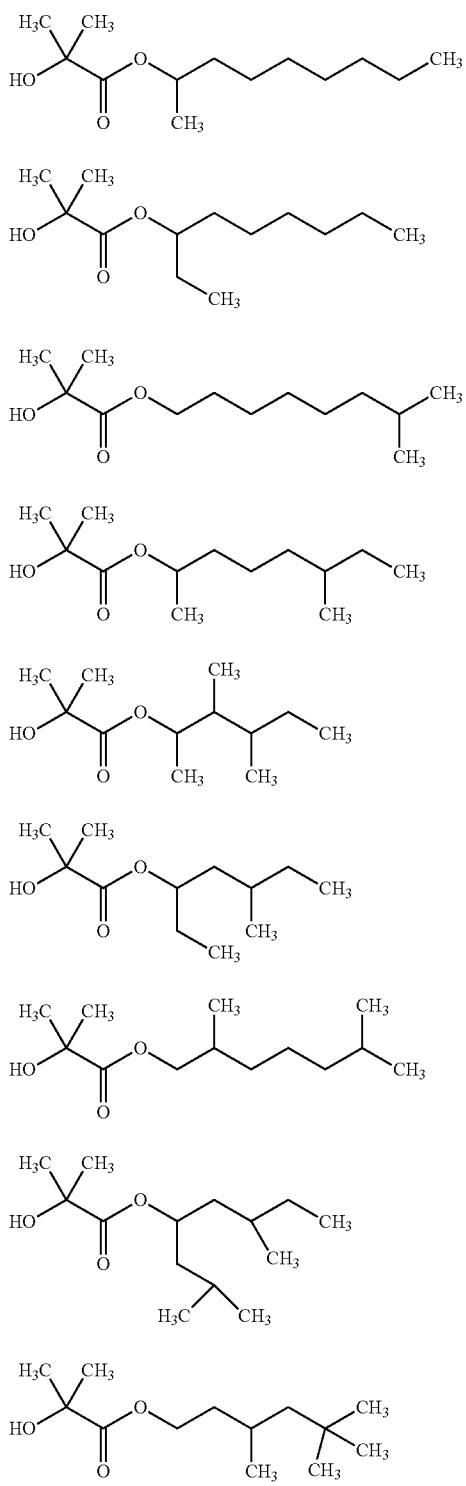

-continued
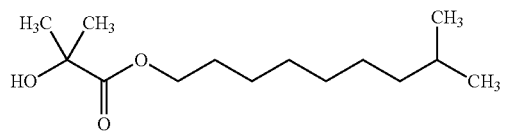 (1-31)
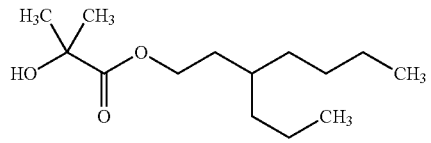 (1-32)
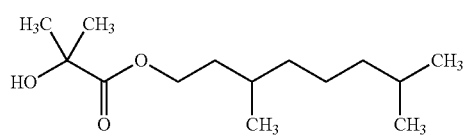 (1-33)
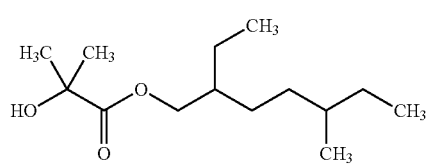 (1-34)
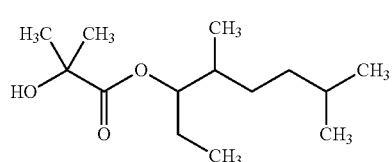 (1-35)
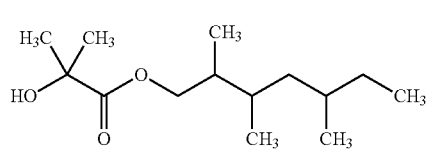 (1-36)
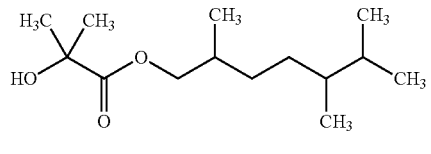 (1-37)
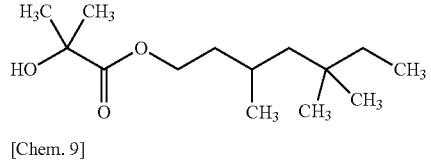 (1-38)
[Chem. 9]
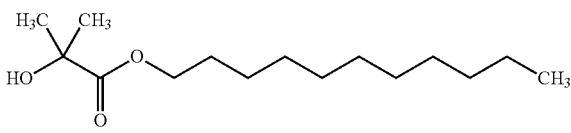 (1-39)
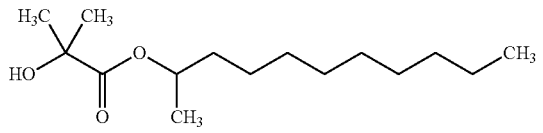 (1-40)
-continued
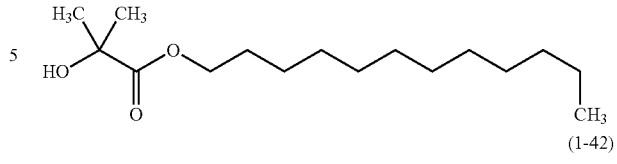 (1-41)
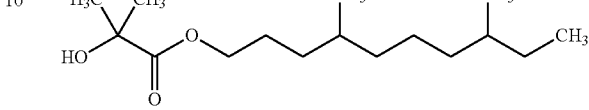 (1-42)
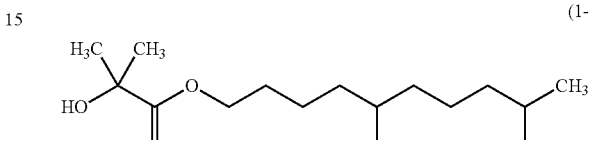 (1-43)
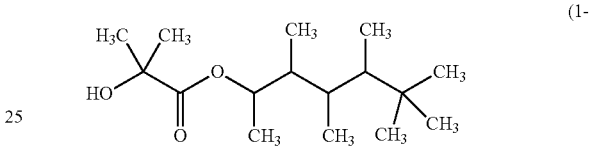 (1-44)
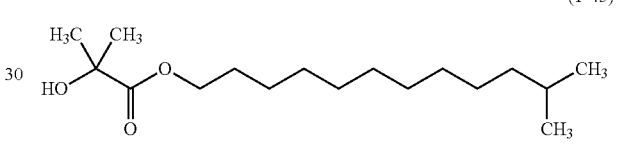 (1-45)
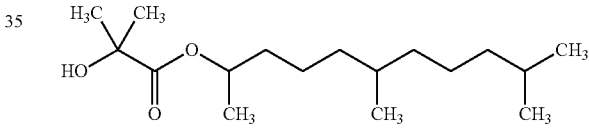 (1-46)
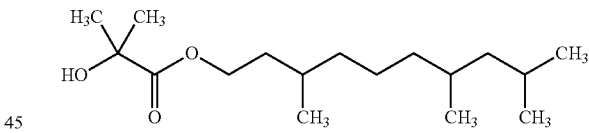 (1-47)
[Chem. 10]
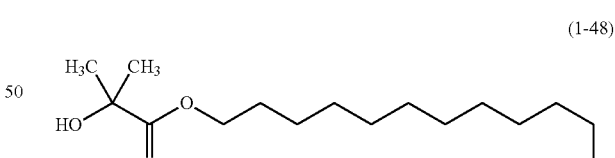 (1-48)
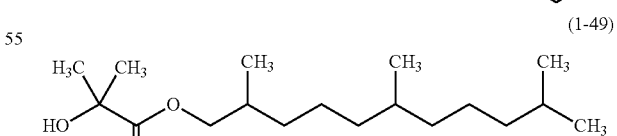 (1-49)
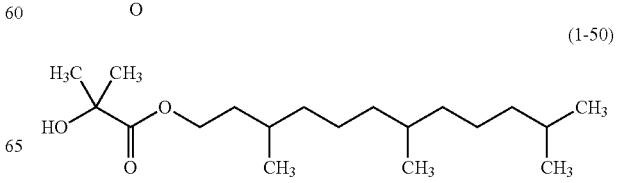 (1-50)

(1-51)
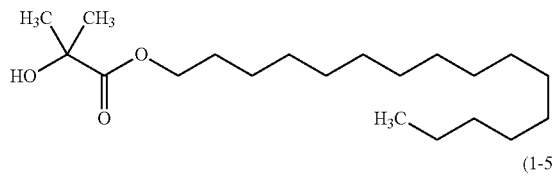
(1-52)
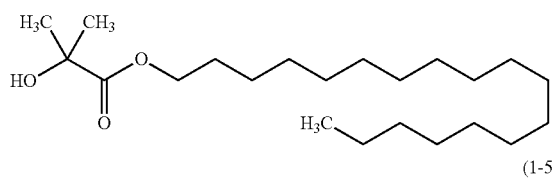
(1-53)
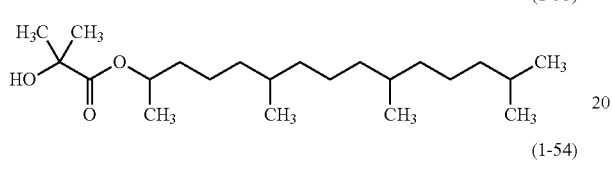
(1-54)
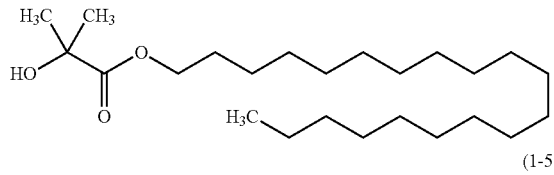
(1-55)
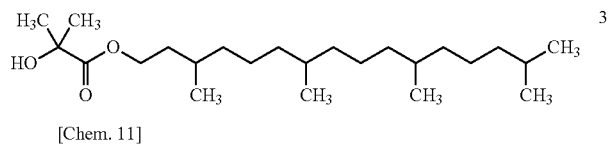
[Chem. 11]
(1-56)
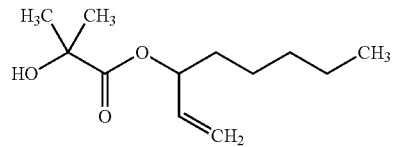
(1-57)
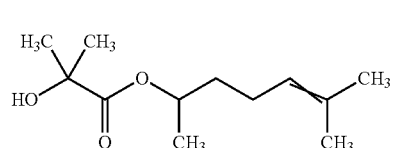
(1-58)
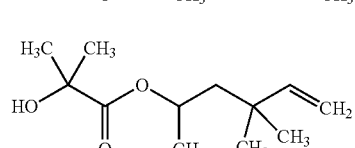
(1-59)
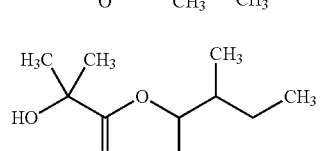
(1-60)
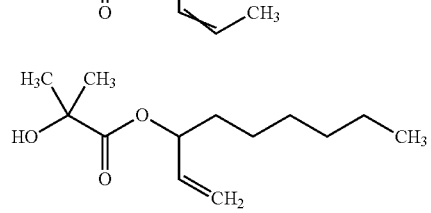
(1-61)
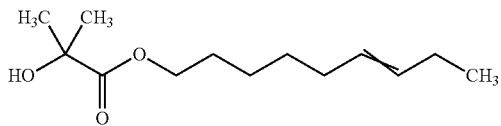
(1-62)
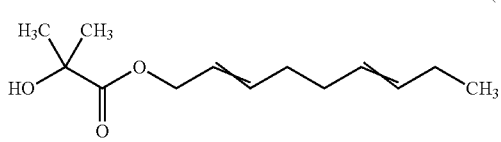
(1-63)
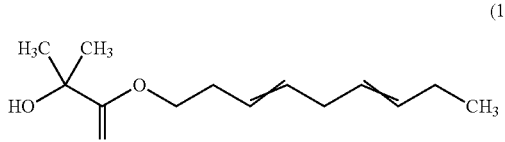
(1-64)
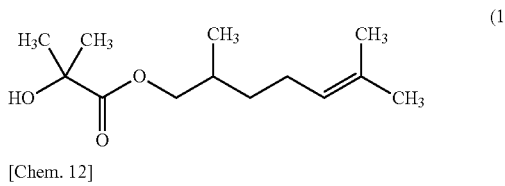
[Chem. 12]
(1-65)
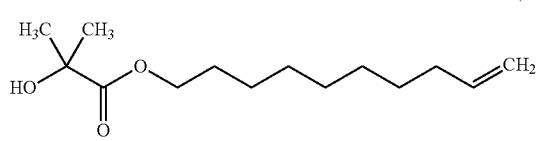
(1-66)
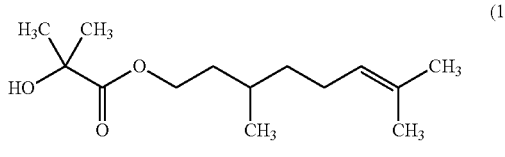
(1-67)
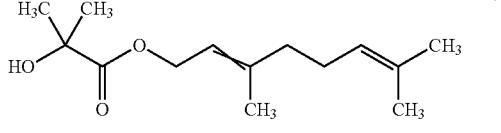
(1-68)
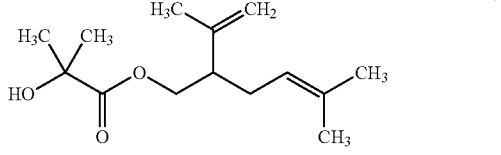
(1-69)
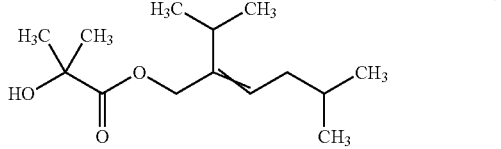
(1-70)
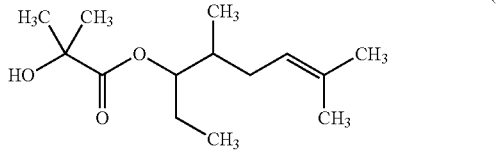

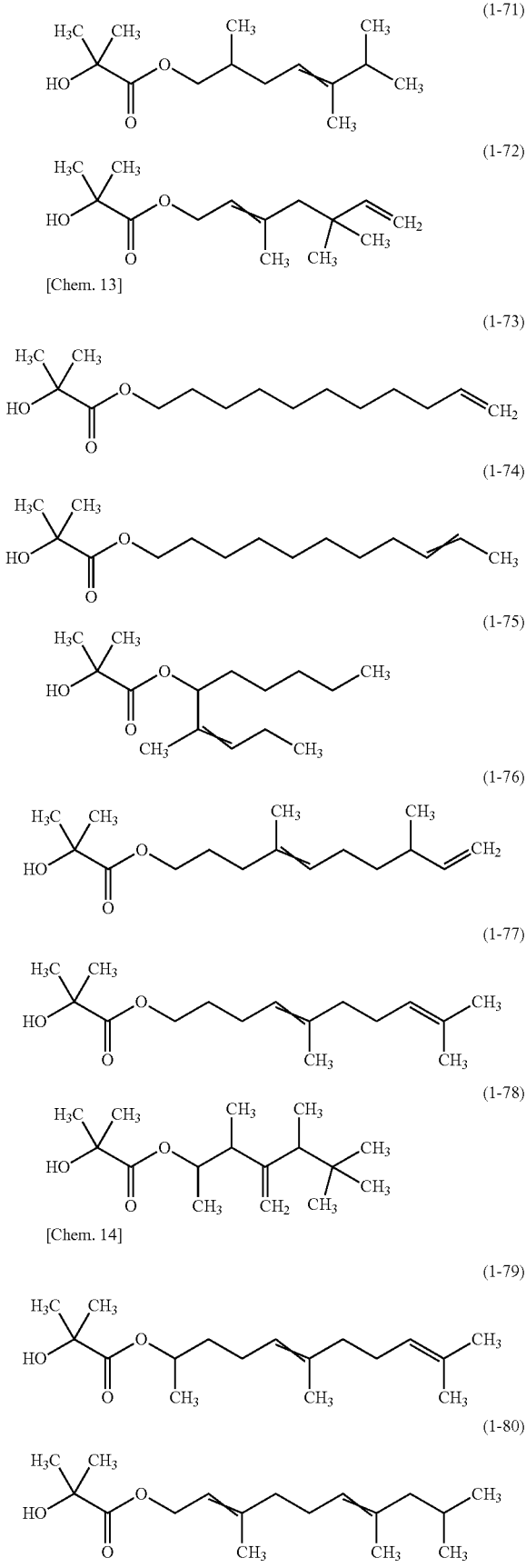

[Chem. 13]

[Chem. 14]

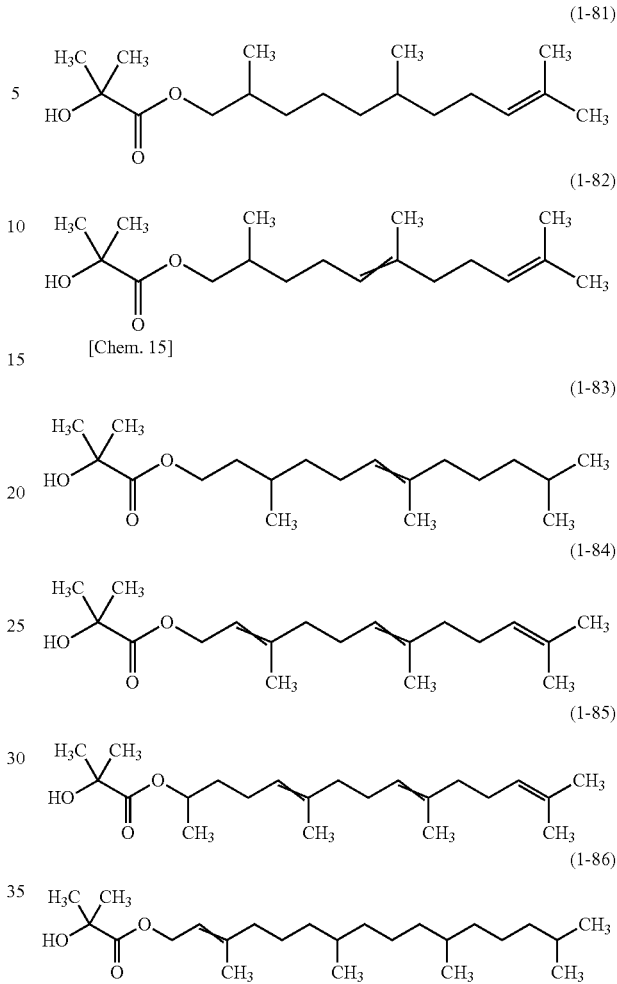

[Chem. 15]

Among the exemplified compounds, those containing a double bond indicated by a crossed double bond represent both the trans isomer (E form) and the cis isomer (Z form) of the stereoisomers resulting from the double bond.

The compound represented by Formula (1) itself has an excellent aroma as described later and thus is useful as a fragrance. Also, in general, a fragrance is rarely used alone and is often used in a fragrance formulation (fragrance composition) formed by blending a plurality of fragrances according to the purpose. The compound represented by Formula (1) is useful as a fragrance (also referred to as a "fragrance ingredient") to be blended in a fragrance formulation (fragrance composition), and the fragrance composition of the present invention contains the compound represented by Formula (1) as an active ingredient. As the fragrance, one of the compounds represented by Formula (1) above may be used alone, or two or more of the compounds may be used in combination.

In addition, this does not exclude that the compound represented by Formula (1) may contain a small amount of impurities, by-products, contaminants, or the like, within a range that does not impair the effects of the present invention.

The compound represented by Formula (1) has a floral aroma as well as an aroma of a woody note, fruity note, spicy note, green note, or the like, and is excellent in diffusivity. The compound represented by Formula (1) may be used alone as a fragrance and added to various perfumes and cosmetics, healthcare and sanitary materials as well as pharmaceutical products, household goods, foods, and the like, to impart an aroma to those products. In addition, the compound represented by Formula (1) may be mixed with another fragrance ingredient or the like to prepare a fragrance composition (fragrance formulation) described later, and this composition may be blended in various products to impart an aroma to those products. Among these, from the viewpoint of obtaining an intended aroma, the compound represented by Formula (1) is preferably blended in a fragrance composition as a fragrance ingredient to prepare a fragrance composition containing the compound represented by Formula (1) as an active ingredient, and the fragrance composition is preferably blended in a product to perfume the product.

<Fragrance Composition>

The fragrance composition (fragrance formulation) of the present invention contains the compound represented by Formula (1) as an active ingredient. The fragrance composition is any composition containing at least one or more compound represented by Formula (1) and is not particularly limited and may contain two or more compounds represented by Formula (1).

The fragrance composition of the present invention contains the compound represented by Formula (1) as an active ingredient; however other components are not particularly limited, and the fragrance composition preferably further contains another fragrance ingredient (hereinafter also referred to as the "known fragrance").

The "fragrance composition (fragrance formulation)" is a composition to be added to various perfumes and cosmetics, pharmaceutical products, foods, beverages, and the like to impart an aroma to these products, or a composition used as it is in a perfume or the like. The fragrance composition may contain an additive, such as a solvent, as necessary in addition to the known fragrance.

The amount of the compound represented by Formula (1) to be blended depends on the type of the compound, the type of intended aroma, the intensity of the aroma, and the like. The amount of the compound represented by Formula (1) in the fragrance composition is preferably 0.001 mass % or greater, more preferably 0.01 mass % or greater, even more preferably 0.1 mass % or greater, and preferably 90 mass % or less, more preferably 70 mass % or less, and even more preferably 50 mass % or less.

The known fragrance is not particularly limited as long as it is a known fragrance component, and a wide range of fragrances can be used. For example, one, or two or more of the following fragrances can be selected and used at any mixing ratio.

Examples thereof include hydrocarbons such as limonene, α-pinene, β-pinene, terpinene, cedrene, longifolene, and valencene; alcohols such as linalool, citronellol, geraniol, nerol, terpineol, dihydromyrcenol, ethyllinalool, farnesol, nerolidol, cis-3-hexenol, cedrol, menthol, borneol, β-phenylethyl alcohol, benzyl alcohol, phenyl hexanol, 2,2,6-trimethylcyclohexyl-3-hexanol, 1-(2-t-butylcyclohexyloxy)-2-butanol, 4-isopropylcyclohexane methanol, 4-t-butylcyclohexanol, 4-methyl-2-(2-methylpropyl)tetrahydro-2H-pyran-4-ol, 2-methyl-4-(2,2,3-trimethyl-3-cyclopenten-1-yl)-2-butene-1-ol, 2-ethyl-4-(2,2,3-trimethyl-3-cyclopenten-1-yl)-2-buten-1-ol, isocamphylcyclohexanol, and 3,7-dimethyl-7-methoxyoctane-2-ol; phenols such as eugenol, thymol, and vanillin; esters such as linalyl formate, citronellyl formate, geranyl formate, n-hexyl acetate, cis-3-hexenyl acetate, linalyl acetate, citronellyl acetate, geranyl acetate, neryl acetate, terpinyl acetate, nopyl acetate, bornyl acetate, isobronyl acetate, o-t-butylcyclohexyl acetate, p-t-butylcyclohexyl acetate, tricyclodecenyl acetate, benzyl acetate, styralyl acetate, cinnamyl acetate, dimethylbenzylcarbinyl acetate, 3-pentyltetrahydropyran-4-yl acetate, citronellyl propionate, tricyclodecenyl propionate, allylcyclohexyl propionate, ethyl-2-cyclohexyl propionate, benzyl propionate, citronellyl butyrate, dimethylbenzylcarbinyl n-butyrate, tricyclodecenyl isobutyrate, methyl-2-nonenoate, methyl benzoate, benzyl benzoate, methyl cinnamate, methyl salicylate, n-hexyl salicylate, cis-3-hexenyl salicylate, geranyl tiglate, cis-3-hexenyl tiglate, methyl jasmonate, methyldihydro jasmonate, methyl-2,4-dihydroxy-3,6-dimethyl benzoate, ethylmethylphenyl glycidate, methyl anthranilate, and FRUITATE; aldehydes such as n-octanal, n-decanal, n-dodecanal, 2-methylundecanal, 10-undecenal, citronellal, citral, hydroxycitronellal, dimethyl tetrahydrobenzaldehyde, 4(3)-(4-hydroxy-4-methylpentyl)-3-cyclohexene-1-carboaldehyde, 2-cyclohexyl propanal, p-t-butyl-α-methylhydrocinnamic aldehyde, p-isopropyl-α-methylhydrocinnamic aldehyde, p-ethyl-α,α-dimethylhydrocinnamic aldehyde, α-amylcinnamic aldehyde, α-hexylcinnamic aldehyde, piperonal, and α-methyl-3,4-methylenedioxyhydrocinnamic aldehyde; ketones such as methylheptenone, 4-methylene-3,5,6,6-tetramethyl-2-heptanone, amylcyclopentanone, 3-methyl-2-(cis-2-pentene-1-yl)-2-cyclopentene-1-on, methylcyclopentenolone, rose ketones, γ-methylionone, α-ionone, carbone, menthone, camphor, nootkatone, benzylacetone, anisylacetone, methyl-β-naphthylketone, 2,5-dimethyl-4-hydroxy-3(2H)-furanone, maltol, 7-acetyl-1,2,3,4,5,6,7,8-octahydro-1,1,6,7-tetramethyl naphthalene, muscone, civetone, cyclopentadecanone, and cyclohexadecenone; acetals and ketals such as acetoaldehyde ethylphenylpropyl acetal, citraldiethyl acetal, phenylacetoaldehyde glycerin acetal, and ethylacetoacetate ethyleneglycol ketals; ethers such as anethole, β-naphthylmethyl ether, β-naphthylethyl ether, limonene oxide, rose oxide, 1,8-cineol, and racemic or photoactive dodecahydro-3a,6,6,9a-tetramethylnaphtho[2,1-b]furane; nitriles such as citronellyl nitrile; lactones such as γ-nonalactone, γ-undecalactone, σ-decalactone, γ-jasmolactone, coumarin, cyclopentadecanolide, cyclohexadecanolide, ambrettolide, ethylene brassylate, and 11-oxahexadecanolide; natural essential oils and natural extracts of orange, lemon, bergamot, mandarin, peppermint, spearmint, lavender, chamomile, rosemary, eucalyptus, sage, basil, rose, geranium, jasmine, ylang-ylang, anise, clove, ginger, nutmeg, cardamom, cedar, Japanese cypress, sandalwood, vetiver, patchouli, and labdanum; and other fragrance materials such as synthetic fragrances.

In addition, the fragrance composition may also contain, as a component other than the fragrance ingredient, a surfactant, such as polyoxyethylene lauryl sulfate ether; a solvent, such as dipropylene glycol, diethyl phthalate, ethylene glycol, propylene glycol, methyl myristate, or triethyl citrate; an antioxidant; or a colorant.

The compound represented by Formula (1) has a floral aroma as well as an aroma of a woody note, fruity note, spicy note, green note, or the like and thus can impart a natural woody note, a fruity note, a spicy note, or a green note together with a floral note in combination with the known fragrance. Thus, the compound is usefully added to various perfumes and cosmetics, healthcare and sanitary materials as well as to pharmaceutical products, household goods, foods, and the like to impart an aroma to these products.

Examples of products to which the fragrance composition containing the compound represented by Formula (1) can be added to impart an aroma and to improve the aroma of such a product include various products, such as perfumes and cosmetics, health and sanitary materials, miscellaneous goods, beverages, foods, quasi-pharmaceutical products, and pharmaceutical products, and the fragrance composition can be used as an aroma component of, for example, fragrance products, such as perfumes and colognes; hair cosmetics, such as shampoos, rinses, hair tonics, hair creams, mousses, gels, pomades, sprays, and others; skin cosmetics, such as skin lotions, essences, creams, milky lotions, packs, foundations, face powders, lipsticks, and various make-up products; various health and sanitary detergents, such as dish washing detergents, laundry detergents, softeners, disinfecting detergents, anti-odor detergents, indoor fragrances, furniture cares, glass cleaners, furniture cleaners, floor cleaners, disinfectants, insecticides, bleaching agents, bactericides, repellants, and others; quasi-pharmaceutical products, such as toothpastes, mouthwashes, bath additives, antiperspirant products, and permanent liquids; miscellaneous goods, such as toilet paper and tissue paper; pharmaceutical products; and foods.

The amount of the fragrance composition blended in the product is not particularly limited, and the amount of the fragrance composition blended can be selected over a wide range, depending on the type, nature, and sensory benefits of the product to be perfumed. For example, the amount may be 0.00001 mass % or greater, preferably 0.0001 mass % or greater, more preferably 0.001 mass % or greater. In the case of a fragrance such as perfume or the like, for example, the amount may be 100 mass %, preferably 80 mass % or less, more preferably 60 mass % or less, and even more preferably 40 mass % or less.

[Compound Represented by Formula (2)]

The compound of the present invention is represented by Formula (2). The compound represented by Formula (2) is hereinafter also referred to as the "branched isobutyric acid ester of the present invention".

[Chem. 16]

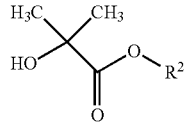

(2)

where in Formula (2), $R^2$ represents a saturated branched chain hydrocarbon group having from 7 to 20 carbons, with the proviso that a 2-ethylhexyl group is excluded.

Although α-hydroxyisobutyric acid ester compounds have been known, there has been no description of α-hydroxyisobutyric acid esters of a saturated branched hydrocarbon group having from 7 to 20 carbons except for a 2-ethylhexyl group.

In Formula (2), $R^2$ is a saturated branched chain hydrocarbon group having from 7 to 20 carbons and is preferably a saturated branched chain hydrocarbon group having from 7 to 10 carbons.

Examples of $R^2$ in Formula (2) specifically include 2-methylhexyl group, a 2-ethylpentyl group, a 2,4-dimethylpentyl group, a 2,2-dimethylpentyl group, a 2,4-dimethylpentan-3-yl group, a 5-methylhexan-2-yl group, a 2-ethyl-4-methylpentyl group, a 2,2-dimethylhexyl group, a 2,2,4-trimethylpentyl group, a 4,4-dimethylhexan-2-yl group, a 3,4-dimethylhexan-2-yl group, a 6-methylheptan-2-yl group, a 5-methylheptan-4-yl group, a 5-methylheptan-3-yl group, a 7-methyloctyl group, a 6-methyloctan-2-yl group, a 2,6-dimethylheptyl group, a 2,6-dimethylheptan-4-yl group, a 3,5,5-trimethylhexyl group, a 8-methylnonyl group, a 3-propylheptyl group, a 3,7-dimethyloctyl group, a 2-ethyl-5-methylheptyl group, a 4,7-dimethyloctan-3-yl group, a 2,3,5-trimethylheptyl group, a 2,5,6-trimethylheptyl group, a 3,5,5-trimethylheptyl group, a 4,8-dimethyldecyl group, a 5,9-dimethyldecyl group, a 3,4,5,6,6-pentamethylheptan-2-yl group, a 11-methyldodecyl group, a 6,10-dimethylundecan-2-yl group, and a 3,7,9-trimethyldecyl group.

When the $R^2$ group has an asymmetric carbon, the compound represented by Formula (2) contains any one of the resulting optical isomers or a mixture of the optical isomers in any proportion.

The $R^2$ group is preferably a saturated branched hydrocarbon group.

The $R^2$ group is preferably a saturated branched hydrocarbon group having at least one or more quaternary carbon atom(s).

The $R^2$ group is particularly preferably a 5-methylhexan-2-yl group.

The $R^2$ group is particularly preferably a 6-methylheptan-2-yl group.

The $R^2$ group is particularly preferably a 3,5,5-trimethylhexyl group.

The $R^2$ group is particularly preferably a 3,7-dimethyloctyl group.

The branched isobutyric acid ester of the present invention is exemplified by a compound represented by any of Formulas (2-1) to (2-33) below.

[Chem. 17]

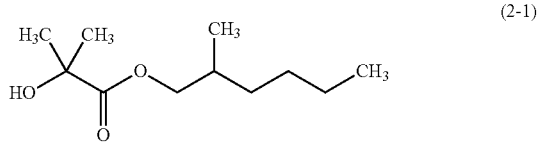

(2-1)

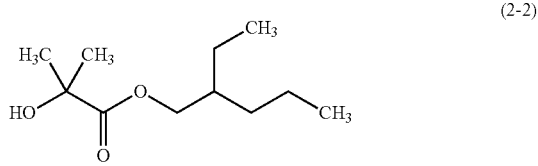

(2-2)

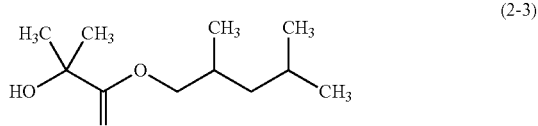

(2-3)

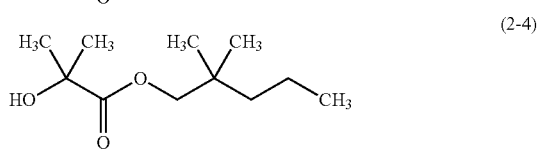

(2-4)

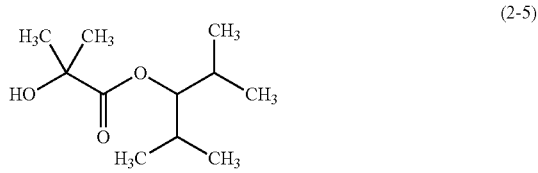

(2-5)

-continued
(2-6)
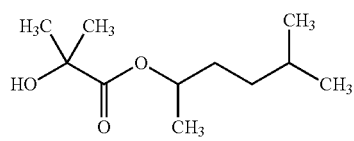
[Chem. 18]
(2-7)
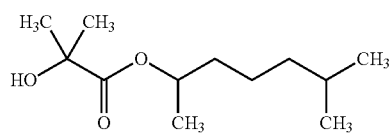
(2-8)
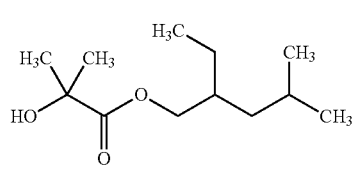
(2-9)
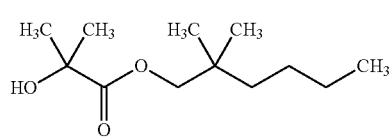
(2-10)
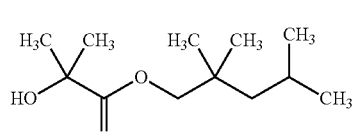
(2-11)
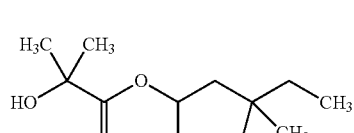
(2-12)
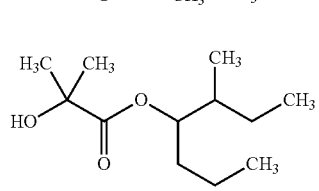
[Chem. 19]
(2-13)
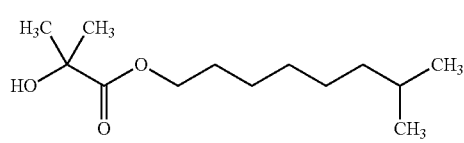
(2-14)
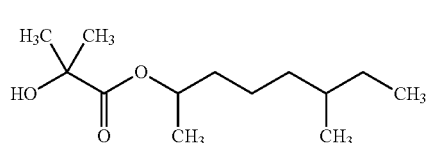
(2-15)
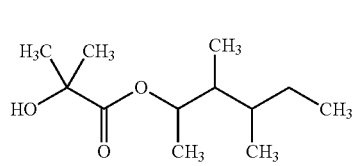
-continued
(2-16)
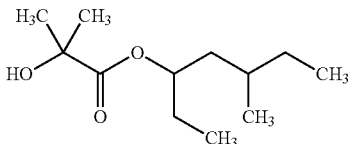
(2-17)
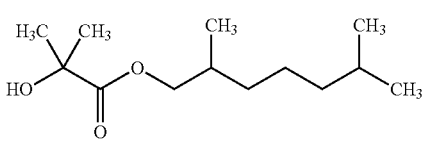
(2-18)
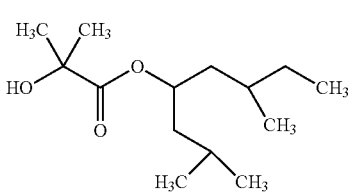
(2-19)
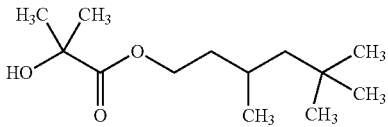
[Chem. 20]
(2-20)
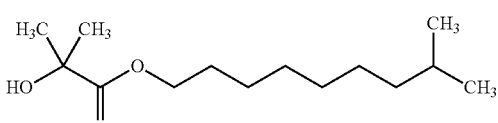
(2-21)
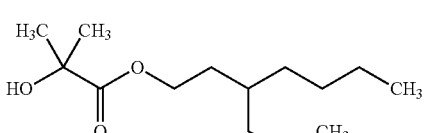
(2-22)
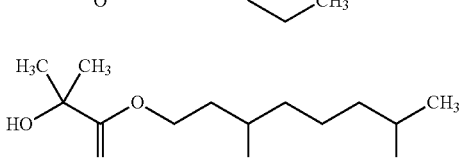
(2-23)
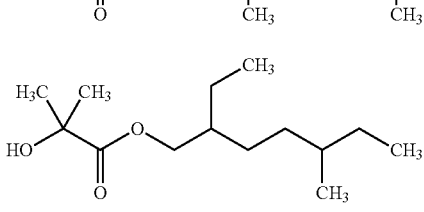
(2-24)
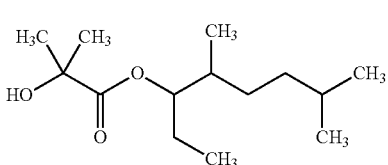
(2-25)
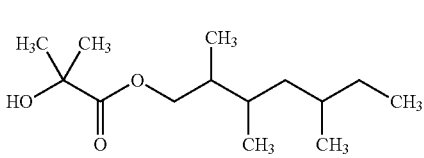

21

-continued (2-26)
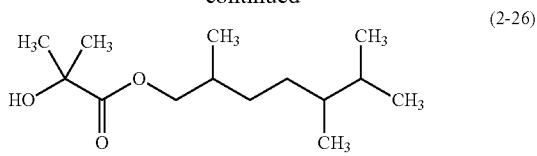

(2-27)
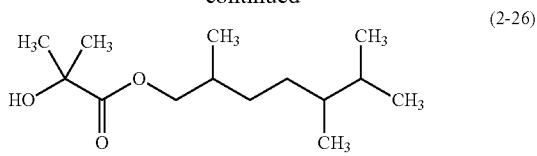

[Chem. 21]

(2-28)

(2-29)
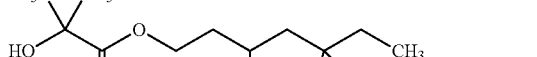

(2-30)

(2-31)

(2-32)

(2-33)

As exemplified, the branched isobutyric acid ester of the present invention is an α-hydroxyisobutyric acid ester of a saturated branched hydrocarbon group having from 7 to 20 carbons, with the proviso that a 2-ethylhexyl group is excluded. In addition, the branched isobutyric acid ester of the present invention preferably includes those having at least one or more quaternary carbon atom(s).

The branched isobutyric acid ester of the present invention is an isobutyric acid ester excluding the saturated linear hydrocarbon group and unsaturated hydrocarbon group of $R^1$ in the compound represented by Formula (1). Thus, the branched isobutyric acid ester of the present invention is useful alone as a fragrance and is also useful as an active ingredient in a fragrance composition.

22

[Compound Represented by Formula (3)]

The compound of the present invention is represented by Formula (3). The compound represented by Formula (3) is hereinafter also referred to as the "unsaturated isobutyric acid ester of the present invention".

[Chem. 22]

(3)
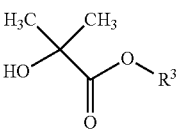

In Formula (3), $R^3$ represents an unsaturated chain hydrocarbon group having from 7 to 20 carbons.

Although α-hydroxyisobutyric acid ester compounds have been known, there has been no description of α-hydroxyisobutyric acid esters of an unsaturated hydrocarbon group having from 7 to 20 carbons.

In Formula (3), $R^3$ is an unsaturated chain hydrocarbon group having from 7 to 20 carbons and is preferably an unsaturated chain hydrocarbon group having from 8 to 15 carbons.

Examples of $R^3$ in Formula (3) specifically include a 1-octen-3-yl group, a 1-nonen-3-yl group, a 6-methyl-5-hepten-2-yl group, a 5-methyl-2-hepten-4-yl group, a 4,4-dimethyl-5-hexen-2-yl group, a 6-nonenyl group, a 2,6-nonadienyl group, a 3,6-nonadienyl group, a 2,6-dimethyl-5-heptenyl group, a 9-decenyl group, a 3,7-dimethyl-6-octenyl group, a 3,7-dimethyl-2,6-octadienyl group, a 2-isopropenyl-5-methyl-4-hexenyl group, a 2-isopropyl-5-methyl-2-hexenyl group, a 4,7-dimethyl-6-octen-3-yl group, a 2,5,6-trimethyl-4-heptenyl group, a 3,5,5-trimethyl-2,6-heptadienyl group, a 9-undecenyl group, a 10-undecenyl group, a 4-methyl-3-decen-5-yl group, a 4,8-dimethyl-4,9-decadienyl group, a 5,9-dimethyl-4,8-decadienyl group, a 3,5,6,6-tetramethyl-4-methyleneheptan-2-yl group, a 6,10-dimethyl-5,9-undecadien-2-yl group, a 3,7,9-trimethyl-2,6-decadienyl group, a 2,6,10-trimethyl-9-undecenyl group, a 2,6,10-trimethyl-5,9-undecadienyl group, an (E)-3,7,11-trimethyl-6,10-dodecadienyl group, a (Z)-3,7,11-trimethyl-6,10-dodecadienyl group, a (2E,6E)-3,7,11-trimethyl-2,6,10-dodecatrienyl group, a (2E,6Z)-3,7,11-trimethyl-2,6,10-dodecatrienyl group, a (2Z,6Z)-3,7,11-trimethyl-2,6,10-dodecatrienyl group, a (2Z,6E)-3,7,11-trimethyl-2,6,10-dodecatrienyl group, a 6,10,14-trimethyl-5,9,13-pentadecatrien-2-yl group, an (E)-3,7,11,15-tetramethyl-2-hexadecenyl group, and a (Z)-3,7,11,15-tetramethyl-2-hexadecenyl group.

When the $R^3$ group has one or more carbon-carbon double bond(s), the compound represented by Formula (3) contains any one of the resulting stereoisomers or a mixture of the stereoisomers in any proportion. When the $R^3$ group has an asymmetric carbon, the compound represented by Formula (3) contains any one of the resulting optical isomers or a mixture of the optical isomers in any proportion.

The $R^3$ group is preferably a hydrocarbon group having a carbon-carbon unsaturated bond.

The $R^3$ group is preferably a branched hydrocarbon group having a carbon-carbon unsaturated bond.

The $R^3$ group is preferably a hydrocarbon group having one or more carbon-carbon double bond(s).

The $R^3$ group is preferably a branched hydrocarbon group having one or more carbon-carbon double bond(s).

The R³ group is particularly preferably a 3,7-dimethyl-6-octenyl group.

The R³ group is particularly preferably a (2E,6E)-3,7,11-trimethyl-2,6,10-dodecatrienyl group.

The R³ group is particularly preferably a (2E,6Z)-3,7,11-trimethyl-2,6,10-dodecatrienyl group.

The R³ group is particularly preferably a (2Z,6Z)-3,7,11-trimethyl-2,6,10-dodecatrienyl group.

The R³ group is particularly preferably a (2Z,6E)-3,7,11-trimethyl-2,6,10-dodecatrienyl group.

The unsaturated isobutyric acid ester of the present invention is exemplified by a compound represented by any of Formulas (3-1) to (3-27) below.

[Chem. 23]

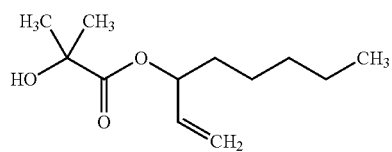
(3-1)

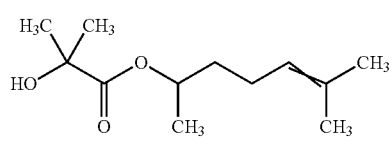
(3-2)

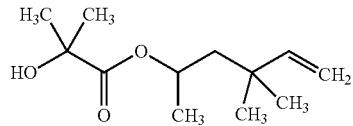
(3-3)

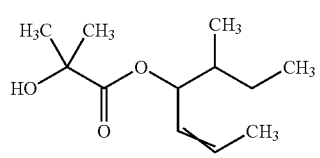
(3-4)

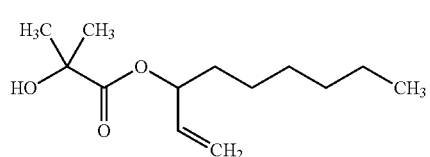
(3-5)

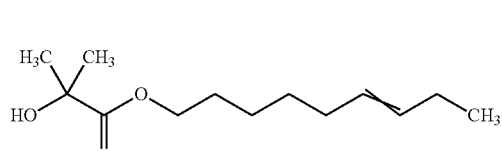
(3-6)

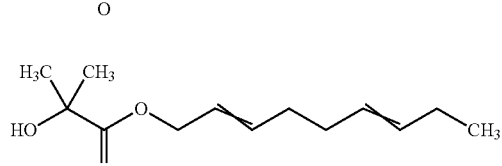
(3-7)

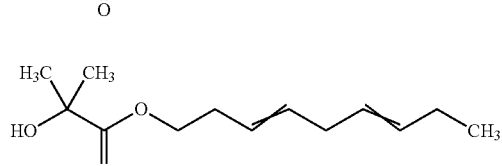
(3-8)

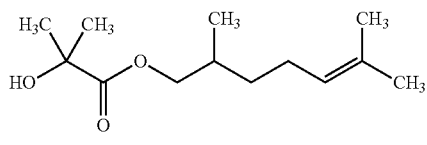
(3-9)

[Chem. 24]

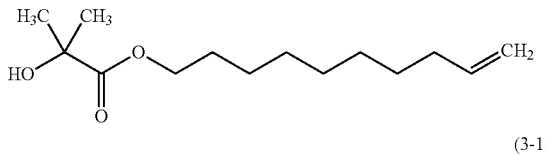
(3-10)

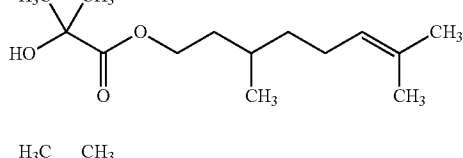
(3-11)

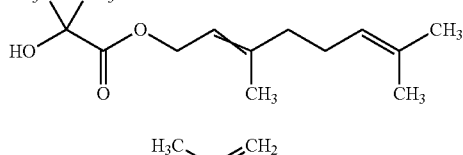
(3-12)

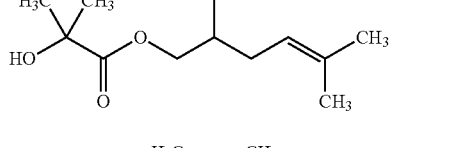
(3-13)

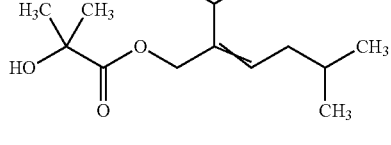
(3-14)

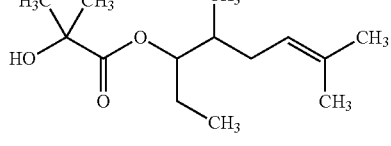
(3-15)

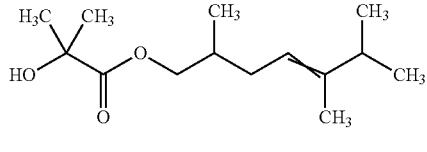
(3-16)

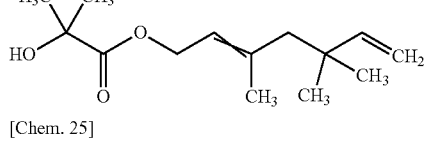
(3-17)

[Chem. 25]

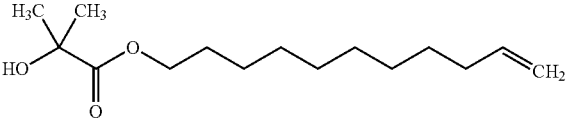
(3-18)

-continued

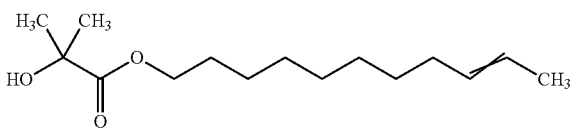 (3-19)

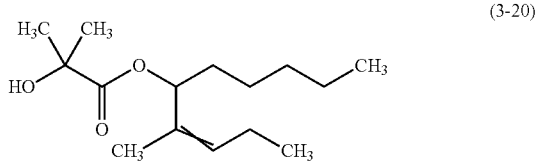 (3-20)

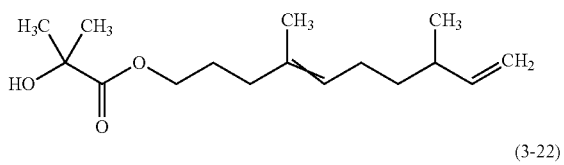 (3-21)

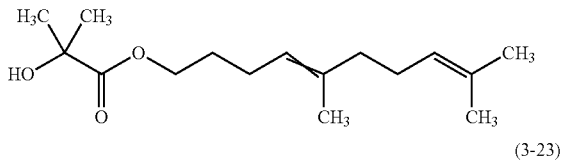 (3-22)

[Chem. 26]

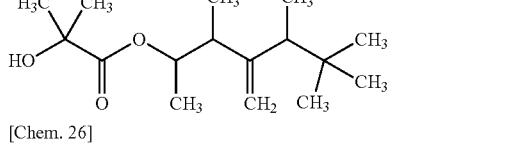 (3-23)

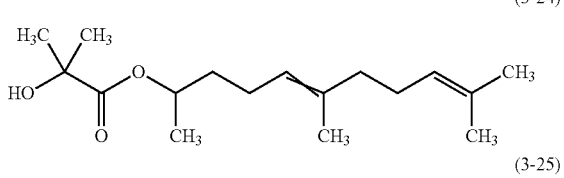 (3-24)

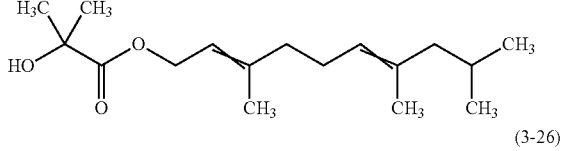 (3-25)

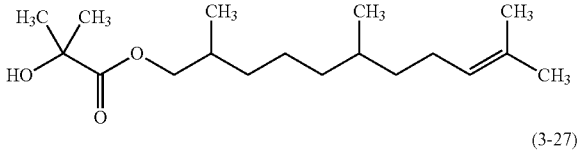 (3-26)

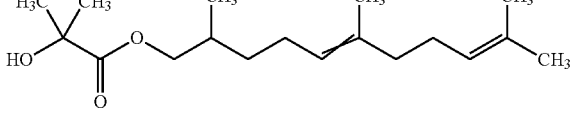 (3-27)

As exemplified, the unsaturated isobutyric acid ester of the present invention is an α-hydroxyisobutyric acid ester of an unsaturated hydrocarbon group having from 7 to 20 carbons. In addition, the unsaturated isobutyric acid ester of the present invention preferably includes those having at least one or more carbon-carbon double bond(s). Among the exemplified compounds, those containing a double bond represented by a crossed double bond represent both the trans isomer (E form) and the cis isomer (Z form) of the stereoisomers resulting from the double bond. In addition, the unsaturated isobutyric acid ester of the present invention preferably includes those having a branched hydrocarbon group.

The unsaturated isobutyric acid ester of the present invention is an isobutyric acid ester excluding the saturated hydrocarbon group of $R^1$ in the compound represented by Formula (1). Thus, the unsaturated isobutyric acid ester of the present invention is useful alone as a fragrance and is also useful as an active ingredient in a fragrance composition.

[Method for Producing Compound Represented by Formula (1)]

The method for producing the compound represented by Formula (1) is not particularly limited and is appropriately selected from methods known in the art and used.

For example, an α-hydroxyisobutyric acid ester can be produced by the Grignard reaction of a pyruvic ester and a methyl halogenated magnesium. The reaction formula of this reaction is shown in Formula (4) below:

[Chem. 27]

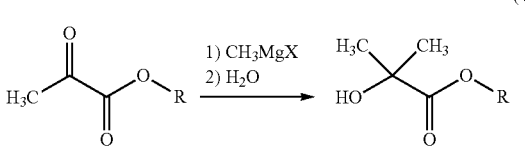 (4)

where in Formula (4), R represents the same chain hydrocarbon group as defined as $R^1$ in Formula (1); and X represents a halogen element, such as chlorine, bromine, or iodine.

An α-hydroxyisobutyric acid ester can be produced by esterification reaction of α-hydroxyisobutyric acid and an alcohol in the presence of a catalyst. The reaction formula of this reaction is shown in Formula (5) below:

[Chem. 28]

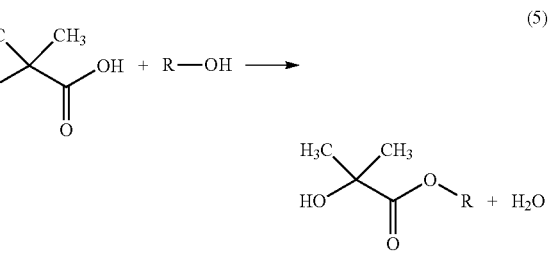 (5)

where in Formula (5), R represents the same chain hydrocarbon group as defined as $R^1$ in Formula (1).

Further, a target α-hydroxyisobutyric acid ester can be produced by transesterification reaction of different types of α-hydroxyisobutyric acid ester and an alcohol in the presence of a catalyst. The reaction formula of this reaction is shown in Formula (6) below:

[Chem. 29]

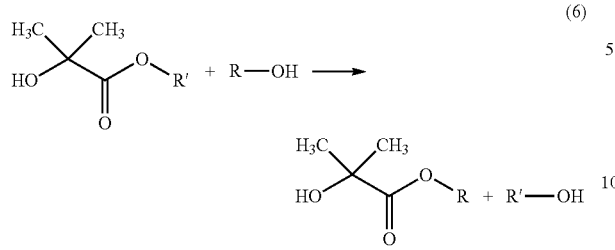

(6)

where in Formula (6), R represents the same chain hydrocarbon group as defined as $R^1$ in Formula (1), and R' is any group different from R and is not particularly limited.

For the catalyst, reaction method, reaction conditions, reaction apparatus, and the like, to be used in these reactions, a catalyst, a reaction method, reaction conditions, and a reaction apparatus known in the art can be used without any particular limitation. In addition, for a method of purifying the resulting compound of Formula (1), known purification method can be employed without any particular limitation.

EXAMPLES

Hereinafter, the present invention will be described in further detail with reference to examples, but the present invention is not limited to these examples.

The reaction performance was evaluated according to the following expression.

Reaction yield (%)=[(number of moles of product ester in reaction solution)/(number of moles of raw material ester in solution fed)]×100%

<Gas Chromatography Analysis (GC Analysis)>
Apparatus: "GC-2010" (available from Shimadzu Corporation, trade name)
Detector: FID
Column: "DB-1" (capillary column available from J&W Scientific, Inc., trade name) (0.25 mmφ×60 m×0.25 μm)
<NMR Spectral Analysis>
Identification of the ester was performed by $^1$H-NMR measurement and $^{13}$C-NMR measurement. The measurement conditions are shown below.
Apparatus: "ECA500" (available from JEOL Ltd., trade name)
[$^1$H-NMR]
Nuclide: $^1$H
Measurement frequency: 500 MHz
Measurement sample: 5% $CDCl_3$ solution
[$^{13}$C-NMR]
Nuclide: $^{13}$C
Measurement frequency: 125 MHz
Measurement sample: 5% $CDCl_3$ solution
<Gas Chromatograph-Mass Spectrum Analysis (GC-MS Analysis)>
Identification of the compounds was also performed by determining the molecular weight by GC-MS measurement (chemical ionization method [CI+], high-resolution mass spectrometry [millimass]). The measurement conditions are shown below.
GC apparatus: "Agilent 7890A" (available from Agilent Technologies, Inc., trade name)
GC Measurement Conditions
Column: "DB-1" (capillary column available from J&W Scientific, Inc., trade name) (0.25 mmφ×30 m×0.25 μm)

MS apparatus: "JMS-T100GCV" (available from JEOL Ltd., trade name)
MS measurement conditions, chemical ionization method
Detector conditions: 200 eV, 300 μA
Detector voltage: 2300 V
GC interface temperature: 210° C.
Ionization chamber temperature: 250° C.
Reagent gas: isobutane The exact mass values of fragments detected in the protonated state by the chemical ionization method and the chemical composition formula thus attributed were described. The exact mass values obtained by the chemical ionization method were described with [CI].

Further, some samples were measured for molecular weight by combining the electrolytic ionization method [FI] and the high-resolution mass spectrometry [millimass]. Except for the conditions below, analytical instruments and analytical conditions were similar to those of the chemical ionization method, but isobutane as the reagent gas was not used.

Ionization chamber temperature: 50° C.
Counter electrode voltage: −10000 V

The exact mass values obtained by the electrolytic ionization method were not protonated, and the chemical composition formula thus assigned was described. The exact mass values obtained by the electrolytic ionization method were described with [FI].
<Product Isolation by Chromatography>
For product isolation by chromatography, materials described below were used.
Filler: "Wakogel C-200" (available from FUJIFILM Wako Pure Chemical Corporation, trade name)
Development solvent: ethyl acetate—hexane Example 1: synthesis of 3,5,5-trimethylhexyl α-hydroxyisobutyrate A 300-mL glass flask equipped with a distillation tube was charged with 40.0 g of methyl α-hydroxyisobutyrate (available from Mitsubishi Gas Chemical Company, Inc.), 58.6 g of 3,5,5-trimethylhexanol (available from Tokyo Chemical Industry Co., Ltd.), and 0.55 g of sodium methoxide (available from FUJIFILM Wako Pure Chemical Corporation). A transesterification reaction was performed under normal pressure with heating and refluxing. The reaction was performed for 8 hours while methanol formed was extracted out of the system. As a result, 3,5,5-trimethylhexyl α-hydroxyisobutyrate was obtained by a reaction of Formula (7) below with a reaction yield of 95%. Water was added to the reaction system to deactivate the catalyst, then the reaction system was distilled under reduced pressure, and 50.8 g of 3,5,5-trimethylhexyl α-hydroxyisobutyrate (purity by GC analysis (hereinafter also referred to as GC purity): 98.9%) was obtained as a distillate at 3 hPa and 94° C. The results of NMR spectral analysis and GC-MS analysis of the resulting isobutyric acid ester are shown below.

3,5,5-Trimethylhexyl α-hydroxyisobutyrate $^1$H NMR (500 MHz, $CDCl_3$) δ0.90 (9H, s), 0.96 (3H, d, J=6.5 Hz), 1.10 (1H, dd, J=14.0, 6.0 Hz), 1.23 (1H, dd, J=14.0, 4.0), 1.43 (3H, s), 1.43 (3H, s), 1.50 (1H, m), 1.61 (1H, dtd, J=13.0, 6.5, 4.0 Hz), 1.68 (1H, dq, J=13.0, 6.5 Hz), 3.18 (1H, s), 4.20 (2H, t, J=6.5 Hz)
$^{13}$C NMR (125 MHz, $CDCl_3$) δ22.60, 26.20, 27.33, 30.03, 31.20, 37.86, 51.04, 64.49, 72.06, 177.74

Exact. Mass [CI] 231.19733 ($C_{13}H_{26}O_3$, parent peak), 127.15036 ($C_9H_{18}$)

[Chem. 30]

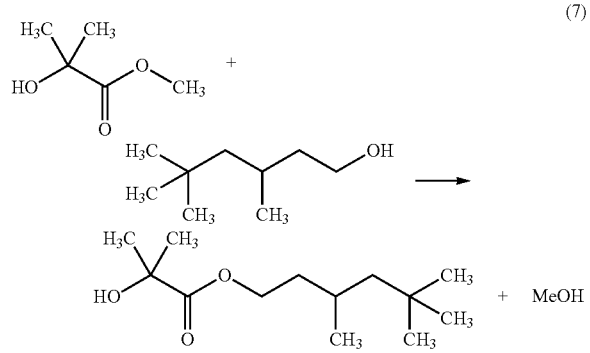

(7)

Examples 2 to 10: Syntheses of Various α-Hydroxyisobutyric Acid Esters

Using the same reaction apparatus as in Example 1, an appropriate amount of methyl α-hydroxyisobutyrate (available from Mitsubishi Gas Chemical Company, Inc.) was transesterified with an alcohol of various types (n-octanol, 3,7-dimethyloctanol, 3,7-dimethyl-6-octenol, 2-ethylhexanol, 3-octanol, 1-octen-3-ol, 6-methylheptan-2-ol, 5-methylhexan-2-ol, or 3,7,11-trimethyl-2,6,10-dodecatrienol) in the presence of a suitable catalyst, such as a titanium tetraalkoxide and/or a sodium alkoxide, and in some cases in the co-presence of a solvent, such as hexane or toluene, under appropriate reaction conditions with heating. The transesterification reaction was completed while methanol formed by the reaction was extracted out of the system by distillation or by azeotropy with a reaction solvent under the reaction conditions, and α-hydroxyisobutyric acid esters below were each obtained by the same separation operation by distillation or with the column chromatograph as in Example 1. The GC purities of the resulting isobutyric acid esters are shown below. For newly described compounds, the results of NMR spectral analysis and GC-MS analysis are also described.

n-Octyl α-hydroxyisobutyrate

GC purity: 99.9%

3,7-Dimethyloctyl α-hydroxyisobutyrate

GC purity: 99.5%

$^1$H NMR (500 MHz, CDCl$_3$) δ0.87 (6H, d, J=6.5 Hz), 0.91 (3H, d, J=6.5 Hz), 1.12-1.16 (3H, m), 1.22-1.33 (3H, m), 1.42 (6H, s), 1.43-1.54 (3H, m), 1.70 (1H, dq, J=12.5, 6.5 Hz), 3.11 (1H, s), 4.17-4.25 (2H, m)

$^{13}$C NMR (125 MHz, CDCl$_3$) δ9.64, 22.72, 22.81, 24.75, 27.32, 28.07, 29.94, 35.55, 37.19, 39.28, 64.56, 72.08, 177.75

Exact. Mass [CI] 245.21163 ($C_{14}H_{28}O_3$, parent peak), 141.16420 ($C_{10}H_{20}$)

3,7-Dimethyl-6-octenyl α-hydroxyisobutyrate

GC purity: 98.4%

$^1$H NMR (500 MHz, CDCl$_3$) δ0.93 (3H, d, J=6.5 Hz), 1.20 (1H, dddd, J=13.5, 9.0, 7.5, 6.0), 1.35 (1H, dddd, J=13.5, 9.0, 6.5, 5.5), 1.42, (6H, s), 1.48 (1H, m), 1.56 (1H, m), 1.60 (3H, s), 1.68 (3H, s) 1.71 (1H, m), 1.92-2.05 (2H, m), 3.11 (1H, s), 4.17-4.25 (2H, m), 5.08 (1H, tt, J=7.0 Hz, 1.5 Hz)

$^{13}$C NMR (125 MHz, CDCl$_3$) δ7.78, 19.51, 25.47, 25.84, 27.30, 29.46, 35.49, 37.00, 64.46, 72.07, 124.53, 131.62, 177.73

Exact. Mass [CI] 243.19691 ($C_{14}H_{26}O_3$, parent peak), 139.14897 ($C_{10}H_{18}$)

2-Ethylhexyl α-hydroxyisobutyrate

GC purity: 99.8%

Oct-3-yl α-hydroxyisobutyrate

GC purity: 99.8%

$^1$H NMR (500 MHz, CDCl$_3$) δ0.87-0.91 (6H, m), 1.26-1.30 (6H, m), 1.43 (s, 3H), 1.43 (s, 3H), 1.56-1.62 (4H, m), 3.20 (1H, s), 4.88 (1H, qn, J=6.5 Hz)

$^{13}$C NMR (125 MHz, CDCl$_3$) δ9.47, 13.93, 22.48, 24.84, 26.94, 27.17, 27.19, 31.57, 33.51, 71.94, 77.32, 177.47

Exact. Mass [CI] 217.18252 ($C_{12}H_{24}O_3$, parent peak), 105.05765 ($C_4H_8O_3$)

1-Octen-3-yl α-hydroxyisobutyrate

GC purity: 99.8%

$^1$H NMR (500 MHz, CDCl$_3$) δ0.89 (3H, t, J=6.5 Hz), 1.25-1.35 (6H, m), 1.44 (3H, s), 1.45 (3H, s), 1.58-1.69 (2H, m), 3.14 (1H, s), 5.19 (1H, dt, J=10.5, 1.0 Hz), 5.25 (1H, dt, J=17.0, 1.0 Hz), 5.28 (1H, qt, J=6.5, 1.0 Hz), 5.79 (1H, ddd, J=17.0, 10.5, 6.5)

$^{13}$C NMR (125 MHz, CDCl$_3$) δ4.07, 22.60, 24.76, 27.28, 31.56, 34.21, 72.09, 76.44, 117.07, 136.12, 177.03

Exact. Mass [CI] 215.16762 ($C_{12}H_{22}O_3$, parent peak), 111.11767 ($C_8H_{14}$)

6-Methylhept-2-yl α-hydroxyisobutyrate

GC purity: 99.9%

$^1$H NMR (500 MHz, CDCl$_3$) δ0.86 (6H, d, J=6.0 Hz), 1.14-1.20 (2H, m), 1.24 (3H, d, J=6.0 Hz), 1.26-1.35 (2H, m), 1.41 (3H, s), 1.42 (3H, s), 1.46-1.55 (2H, m), 1.59 (1H, m), 3.17 (1H, s), 4.96 (1H, sext, J=6.5 Hz)

$^{13}$C NMR (125 MHz, CDCl$_3$) δ9.82, 22.42, 22.47, 23.00, 27.06, 27.08, 27.75, 35.95, 38.53, 71.81, 72.71, 177.18

Exact. Mass [CI] 217.18164 ($C_{12}H_{24}O_3$, parent peak), 113.13416 ($C_8H_{16}$)

5-Methylhex-2-yl α-hydroxyisobutyrate

GC purity: 99.7%

$^1$H NMR (500 MHz, CDCl$_3$) δ0.88 (3H, d, J=6.5 Hz), 0.88 (3H, d, J=6.5 Hz), 1.16-1.22 (2H, m), 1.24 (3H, d, J=6.0 Hz), 1.41 (3H, s), 1.42 (3H, s), 1.50-1.54 (2H, m), 1.60 (1H, m) 3.16 (1H, s) 4.94 (1H, sext J=6.5 Hz)

$^{13}$C NMR (125 MHz, CDCl$_3$) δ9.83, 22.43, 22.53, 27.09, 27.12, 27.78, 33.57, 34.34, 71.85, 73.03, 177.22

Exact. Mass [CI] 203.16554 ($C_{11}H_{22}O_3$, parent peak), 105.05609 ($C_4H_8O_3$)

3,7,11-Trimethyl-2,6,10-dodecatrienyl α-hydroxyisobutyrate

GC purity: 98.2% (as a total value of four isomers)

Farnesol used as a raw material was a mixture of four isomers resulting from two double bonds with a composition ratio of 54.0% of (2E,6E)-3,7,11-trimethyl-2,6,10-dodecatrien-1-ol, 42.1% of (2E,6Z)-3,7,11-trimethyl-2,6,10-dodecatrien-1-ol, and 3.9% total remainder of (2Z,6Z)-3,7,11-trimethyl-2,6,10-dodecatrien-1-ol and (2Z,6E)-3,7,11-trimethyl-2,6,10-dodecatrien-1-ol.

The α-hydroxyisobutyric acid ester of the farnesol obtained through the purification process had a composition ratio of 59.8% of an ester derived from (2E,6E)-3,7,11-trimethyl-2,6,10-dodecatrien-1-ol, 37.9% of an ester derived from (2E,6Z)-3,7,11-trimethyl-2,6,10-dodecatrien-1-ol, and 2.3% total remainder of esters derived from (2Z,6Z)-3,7,11-trimethyl-2,6,10-dodecatrien-1-ol and (2Z,6E)-3,7,11-trimethyl-2,6,10-dodecatrien-1-ol. Two isomers with low abundance were not identified. Individual GC-MS analyses are shown below.

Ester derived from (2E,6E)-3,7,11-trimethyl-2,6,10-dodecatrien-1-ol;
Exact.Mass [FI] 308.23700 ($C_{19}H_{32}O_3$, parent peak),
Ester derived from (2E,6Z)-3,7,11-trimethyl-2,6,10-dodecatrien-1-ol;
Exact.Mass [FI] 308.23884 ($C_{19}H_{32}O_3$, parent peak), 204.18909 ($C_{15}H_{24}$)
Esters derived from (2Z,6Z)-3,7,11-trimethyl-2,6,10-dodecatrien-1-ol and (2Z,6E)-3,7,11-trimethyl-2,6,10-dodecatrien-1-ol (not identified);
Exact.Mass [FI] 308.23680 ($C_{19}H_{32}O_3$, parent peak), 204.19123 ($C_{15}H_{24}$)
Exact.Mass [FI] 308.23547 ($C_{19}H_{32}O_3$, parent peak), 204.20633 ($C_{15}H_{24}$)

The various α-hydroxyisobutyric acid esters obtained by the method described above were evaluated for aroma by a perfumer. The results are shown in Table 1.

TABLE 1

| | Structural formula | Aroma evaluation |
|---|---|---|
| Example 1 | 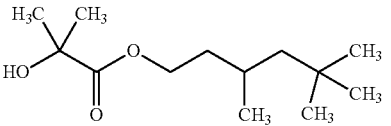 [SMILES: CC(CCOC(=O)C(C)(C)O)CC(C)(C)C] | Floral green aroma<br>Woody aroma<br>Mint-like aroma<br>Coconut-like fruity aroma |
| Example 2 | 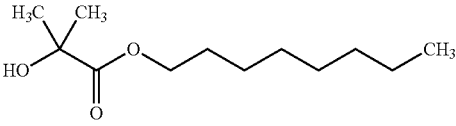 | Muguet-like floral and marine aroma<br>Fresh rose-like floral aroma<br>Muguet-like floral aroma<br>Coconut-like fruity aroma |
| Example 3 | 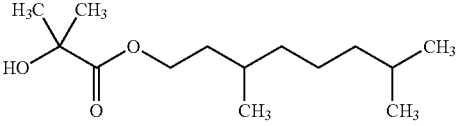 | Muguet-like fresh floral aroma<br>Apple-like fruity aroma<br>Fresh fruity aroma |
| Example 4 | 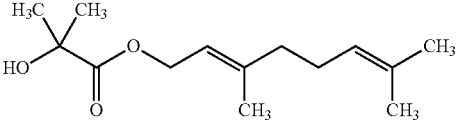 [SMILES: CC(C)=CCC/C(C)=C/COC(=O)C(C)(C)O] | Rose-like floral aroma<br>Apple-like fresh fruity aroma<br>Muguet-like fresh floral aroma |
| Example 5 | 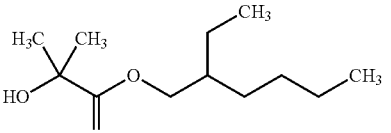 | Spicy jasmine-like floral aroma<br>Peach-like fruity aroma<br>Green aroma |
| Example 6 | 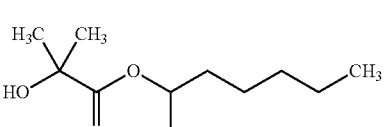 | Spicy jasmine-like floral aroma<br>Fresh rose-like floral aroma<br>Coconut-like fruity aroma |
| Example 7 | 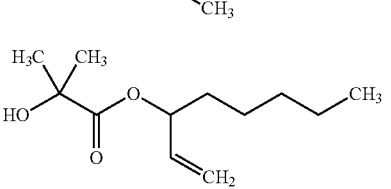 | Floral green aroma<br>Woody amber aroma<br>Coconut-like fruity aroma<br>Rose-like fresh green aroma |

TABLE 1-continued

| | Structural formula | Aroma evaluation |
|---|---|---|
| Example 8 | (structure: α-hydroxyisobutyrate ester of 6-methylhept-2-yl with branched alkyl chain) | Woody and fruity aroma<br>Coconut-like fruity aroma<br>Floral green aroma<br>Honey-like aroma |
| Example 9 | (structure: α-hydroxyisobutyrate ester with branched alkyl chain) | Woody amber aroma<br>Woody aroma<br>Leather note aroma<br>Coconut-like fruity aroma<br>Floral green aroma |
| Example 10 | (structure: α-hydroxyisobutyrate ester with farnesyl-type chain) | Muguet-like floral aroma<br>Coconut-like fruity aroma<br>Animalic aroma |

Example 11: Fragrance Composition with Fresh Aroma Note Recalling Forest

A fragrance composition was formulated in which 100 parts by mass of 3,5,5-trimethylhexyl α-hydroxyisobutyrate obtained in Example 1 was added to 900 parts by mass of a fragrance composition with a composition shown in Table 2.

3,5,5-Trimethylhexyl α-hydroxyisobutyrate of Example 1 was added to a fragrance composition with a composition described in Table 2, and this was able to impart a soft floral impression to the composition and provided a fragrance composition having a fresher aroma note recalling a forest according to aroma evaluation by a perfumer. The aroma of this fragrance composition seems to be suitable for perfuming men's fragrance, bath powders, and the like.

TABLE 2

| Blend ingredients | parts by mass |
|---|---|
| Allyl caproate | 2.0 |
| Anethole | 2.0 |
| L-Borneol | 20.0 |
| Camphene | 8.0 |
| Caryophyllene | 10.0 |
| Fenchyl acetate | 0.8 |
| Isobornyl acetate | 300.0 |
| Ligustral | 5.0 |
| Linalool | 70.0 |
| Linalyl acetate | 60.0 |
| Orange terpene | 160.0 |
| Peppermint oil | 10.0 |
| α-Pinene | 30.0 |
| β-Pinene | 30.0 |
| Terpineol | 50.0 |
| Terpinolene 20 | 2.0 |
| Terpinyl acetate | 140.0 |
| trans-2-Hexenal | 0.2 |
| Total | 900.0 |

Example 12: Citrus Fruity Type Fragrance Composition

A fragrance composition was formulated in which 100 parts by mass of 6-methylhept-2-yl α-hydroxyisobutyrate obtained in Example 8 was added to 900 parts by mass of a fragrance composition with a composition shown in Table 3.

6-Methylhept-2-yl α-hydroxyisobutyrate of Example 8 was added to a fragrance composition with a composition described in Table 3, and this was able to soften the top note of the citrus note and also provide an impression of transparency to the body according to aroma evaluation by a perfumer. As a result, this imparted a woody floral aroma to the composition and provided a more coordinated citrus fruity fragrance composition. The aroma of this fragrance composition seems to be suitable for perfuming haircare products, such as shampoo; fragrances; and the like.

TABLE 3

| Blend ingredients | parts by mass |
|---|---|
| Aldehyde C-10 | 4.0 |
| Aldehyde C-8 | 2.0 |
| Iso E Super | 120.0 |
| Bergamot oil (bergapten free) | 50.0 |
| Citral (synthetic product) | 5.0 |
| δ-Damascone | 3.0 |
| Ethylene brassylate | 100.0 |
| Hedione | 180.0 |
| Heliotropin | 5.0 |
| Lavender oil | 50.0 |
| Lemon oil (bergapten free) | 50.0 |
| Linalool | 30.0 |
| Linalyl acetate | 60.0 |
| Mandarin oil (bergapten free) | 40.0 |
| Mandarin aldehyde 10% triethyl citrate solution | 1.0 |
| Orange oil (Florida) | 200.0 |
| Total | 900.0 |

INDUSTRIAL APPLICABILITY

The α-hydroxyisobutyric acid ester compound of the present invention has an excellent aroma and is expected to be used itself as a fragrance. In addition, the compound is used as a fragrance ingredient and provides a fragrance composition having excellent aroma properties. The composition is blended in various products and exhibits desired perfuming properties.

The invention claimed is:

1. A fragrance composition comprising a compound represented by Formula (1) as an active ingredient:

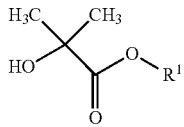

(1)

where in Formula (1), $R^1$ represents a chain hydrocarbon group having from 7 to 20 carbons, and may be linear or branched, and a saturated group or an unsaturated group, and when $R^1$ is an unsaturated group, $R^1$ may have one or more carbon-carbon double bond(s) or carbon-carbon triple bond(s), with the proviso that the following are excluded: a compound where $R^1$ is a t-octyl group.

2. The fragrance composition according to claim 1, wherein in Formula (1), $R^1$ is a linear hydrocarbon group.

3. The fragrance composition according to claim 1, wherein in Formula (1), $R^1$ is a branched hydrocarbon group.

4. The fragrance composition according to claim 3, wherein in Formula (1), $R^1$ has at least one or more quaternary carbon atom(s).

5. The fragrance composition according to claim 1, wherein in Formula (1), $R^1$ is a hydrocarbon group having a carbon-carbon unsaturated bond.

6. The fragrance composition according to claim 5, wherein in Formula (1), $R^1$ is a hydrocarbon group having one or more carbon-carbon double bond(s).

7. The fragrance composition according to claim 5, wherein in Formula (1), $R^1$ is a branched hydrocarbon group.

8. A compound represented by Formula (2):

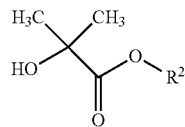

(2)

where in Formula (2), $R^2$ is a saturated branched chain hydrocarbon group having from 7 to 20 carbons, with the proviso that a 2-ethylhexyl group and a t-octyl group are excluded.

9. The compound according to claim 8, wherein in Formula (2), $R^2$ has at least one or more quaternary carbon atom(s).

10. A compound represented by Formula (3):

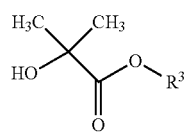

(3)

where in Formula (3), $R^3$ represents an unsaturated chain hydrocarbon group having from 7 to 20 carbons.

11. The compound according to claim 10, wherein in Formula (3), $R^3$ is a hydrocarbon group having at least one or more carbon-carbon double bond(s).

12. The compound according to claim 10, wherein in Formula (3), $R^3$ is a branched hydrocarbon group.

* * * * *